United States Patent [19]
Canova et al.

[11] Patent Number: 6,115,248
[45] Date of Patent: Sep. 5, 2000

[54] DETACHABLE SECUREMENT OF AN ACCESSORY DEVICE TO A HANDHELD COMPUTER

[75] Inventors: Francis J. Canova, Fremont; Madeleine L. Francavilla, Santa Cruz; Neal A. Osborn, Milpitas, all of Calif.; David C. Stowers, Morristown, N.J.; Alan Urban, San Jose, Calif.

[73] Assignee: Palm, Inc., Santa Clara, Calif.

[21] Appl. No.: 09/313,333

[22] Filed: May 17, 1999

[51] Int. Cl.[7] .............................. H05K 5/00; E05C 7/00; A47B 81/00
[52] U.S. Cl. ........................... 361/686; 361/683; 361/66; 361/726; 361/740; 292/8; 292/30; 312/223.1
[58] Field of Search ..................... 361/686, 683, 361/726, 740; 312/223.1; 292/8, 30

[56] References Cited

U.S. PATENT DOCUMENTS

| | | | |
|---|---|---|---|
| 3,744,034 | 7/1973 | Paul | 340/172.5 |
| 3,815,944 | 6/1974 | Noga | 292/261 |
| 4,860,372 | 8/1989 | Kuzunuki et al. | 382/13 |
| 4,972,496 | 11/1990 | Sklarew | 382/13 |
| 5,231,381 | 7/1993 | Duwaer | 340/712 |
| 5,305,394 | 4/1994 | Tanaka | 382/13 |
| 5,389,745 | 2/1995 | Sakamoto | 178/18 |
| 5,434,929 | 7/1995 | Bernink et al. | 382/187 |
| 5,444,192 | 8/1995 | Shetye et al. | 178/18 |
| 5,452,371 | 9/1995 | Bozinovic et al. | 382/187 |
| 5,467,504 | 11/1995 | Yang | 16/342 |
| 5,528,743 | 6/1996 | Tou et al. | 395/148 |
| 5,534,892 | 7/1996 | Tagawa | 345/173 |
| 5,615,284 | 3/1997 | Rhyne et al. | 382/187 |
| 5,621,817 | 4/1997 | Bozinovic et al. | 382/189 |
| 5,630,148 | 5/1997 | Norris | 395/750 |
| 5,698,822 | 12/1997 | Haneda et al. | 178/18 |
| 5,757,616 | 5/1998 | May et al. | 361/683 |
| 5,841,901 | 11/1998 | Arai et al. | 382/187 |

OTHER PUBLICATIONS

Gray, R. et al., "Efficient MC68HC08 programming: reducing cycle count and improving code denistry", *Dr. Dobb's Journal*, vol. 20, No. 5, May 1995, pp. 70–75.
Ruley, J. et al., "Handheld–to–Handheld Combat", *Windows Magazine*, No. 811, p. 55, Nov. 1997.
Dayton, D., "FRx extends reporting power of platinum Series", *PC Week*, vol. 8, No. 5, p. 29(2), Feb. 1991.
Forbes, J. et al., "Palm PCs get a Big Hand (What's Hot)", *Windows Magazine*, No. 905, p. 96, May 1998.
Penwarden, M., "More Muscle for HP's OmniBook", *Windows Magazine*, No. 501, p. 110, Jan. 1994.
Feigel, C., "IBM, Motorola preview embedded PowerPCs; 403 and 505 processors combine strong performance with low cost", *Microprocessor Report*, vol. 8, No. 6, pp. 1–5, May 1994.
Bursky, D., "Evolving DSP chips do more", *Electronic Design*, vol. 38, No. 23, pp. 51–59, Dec. 1990.

*Primary Examiner*—Leo P. Picard
*Assistant Examiner*—Tung Minh Bui
*Attorney, Agent, or Firm*—Van Mahamedi; Wilson Sonsini Goodrich & Rosati

[57] ABSTRACT

Embodiments of this invention provide for coupling an accessory device to a back face of a handheld computer while electrically connecting to the handheld computer through a communications or output port. In one embodiment, the accessory device "piggy-backs" on the handheld computer so that the accessory device and handheld computer form a portable combination. An insertion coupling may be used to detachably secure the accessory device with the handheld computer. The insertion coupling used with embodiments of the invention is preferably a snap-in coupling having one or more biased members. The biased members may be contracted to engage an aperture on a back face of the handled computer. When released, the biased members secure the accessory device to the handheld computer.

26 Claims, 6 Drawing Sheets

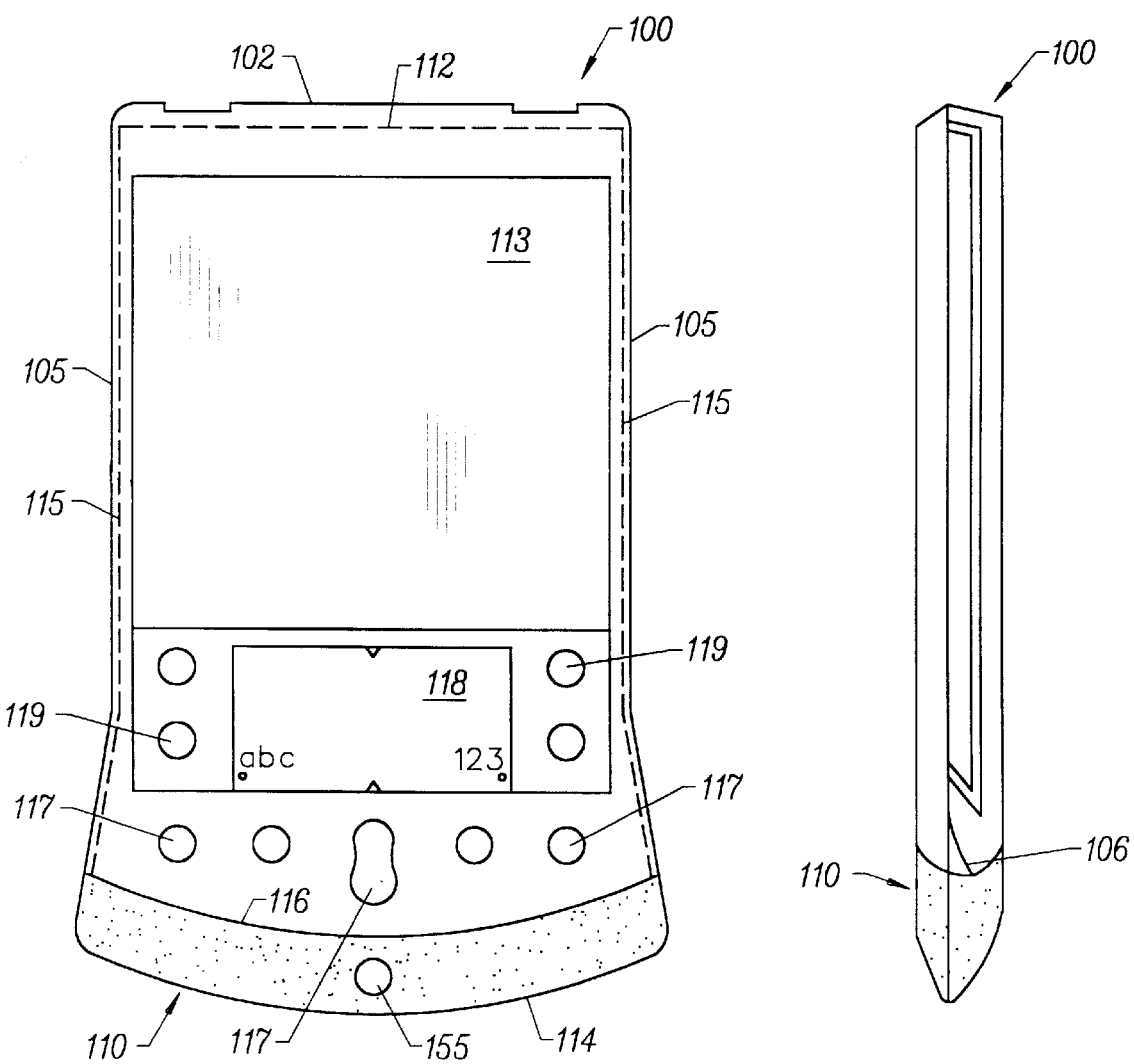
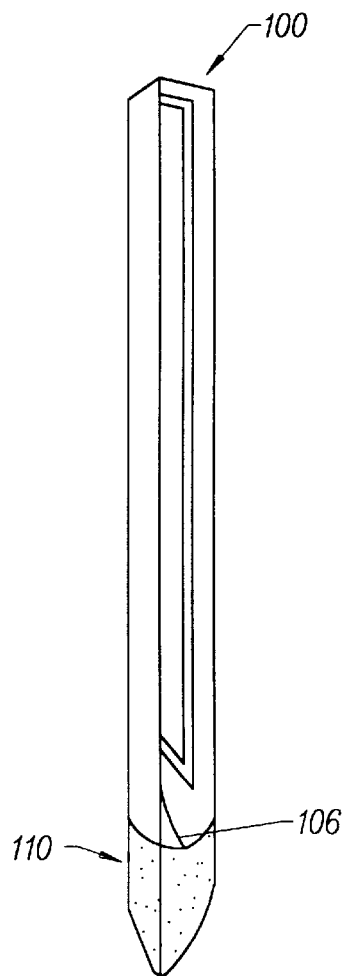
FIG. 1A
FIG. 1B

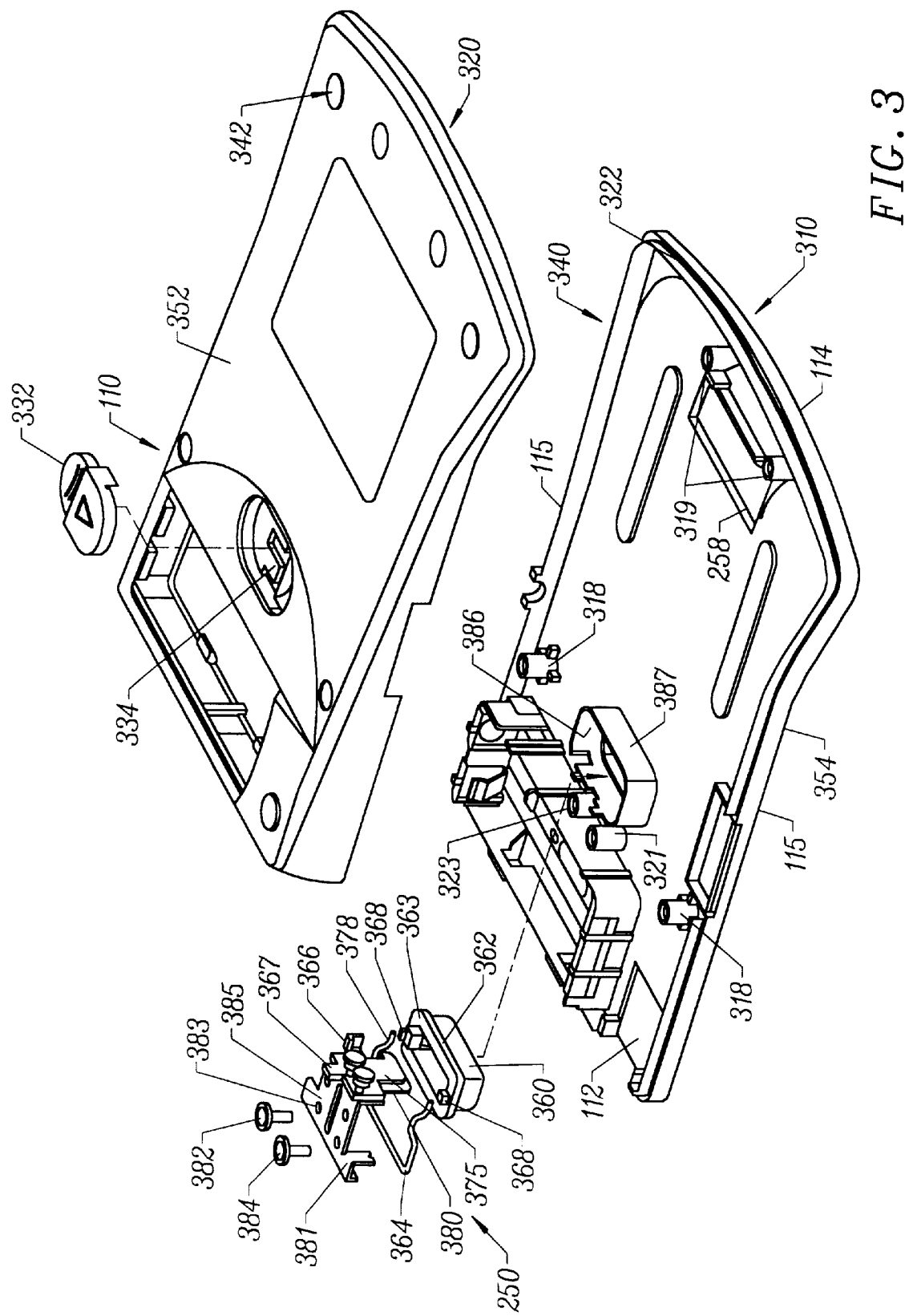

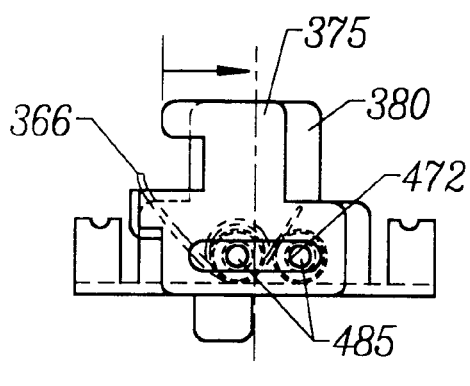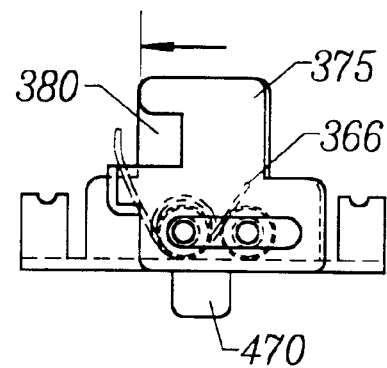
FIG. 6A
FIG. 6B

DETACHABLE SECUREMENT OF AN ACCESSORY DEVICE TO A HANDHELD COMPUTER

BACKGROUND OF THE INVENTION

1. Field of the Invention

This invention pertains to a handheld computing device. More specifically, embodiments of this invention provide for detachably securing an accessory device to a handheld computer using an insertion coupling.

2. Description of the Related Art

A principal feature of handheld computers is portability. To this end, functions and features of handheld computers are sometimes sacrificed to maintain the handheld computer in a small, compacted state. Additional features and functions of the handheld computer may be added by linking the handheld computer to an accessory device. Examples of such accessory devices includes modem devices and communication cradles.

Previous accessory devices have generally been immobile, so that the handheld computer had to use the accessory device as a docking port. However, the widespread use of computers and computer networks has resulted in a need for accessory devices that are portable. Therefore, there is an increasing need for enabling accessory devices to securely couple with a handheld computer without hindering the portability of the handheld computer.

Other previous accessory devices that have been designed to be portable with the handheld computer have relied on coupling mechanism that allows the accessory device to couple with the handheld computer by first placing the handheld computer on the accessory device, and then maneuvering portions of the accessory device around the handheld computer to secure it with the accessory devices. Such coupling mechanisms are overly complicated, requiring the user to perform too many steps and maneuvers to secure the accessory device with the handheld computer. Requiring additional steps to secure the accessory device with the handheld computer leaves the handheld computer prone to being dropped prior to it being secured. This is especially problematic considering that these accessory devices require a free hand from the user for the sole purpose of manipulating portions of the accessory device to secure the handheld computer.

SUMMARY OF THE INVENTION

Embodiments of this invention provide for coupling an accessory device to a back face of a handheld computer while electrically connecting to the handheld computer through a communications or output port. In one embodiment, the accessory device "piggy-backs" on the handheld computer so that the accessory device and handheld computer form a portable combination. An insertion coupling may be used to detachably secure the accessory device with the handheld computer. The insertion coupling used with embodiments of the invention is preferably a snap-in coupling having one or more biased members. The biased members may be contracted to engage an aperture on a back face of the handheld computer. When released, the biased members secure the accessory device to the handheld computer.

In an embodiment, the accessory device incorporates an insertion coupling and has dimensions that complement the handheld computer. The accessory device may then be readily secured to the handheld computer so that the combination of the two devices is portable and easy to handle. Embodiments of the invention may be incorporated with, for example, modem devices which can add communication abilities to the handheld computer.

BRIEF DESCRIPTION OF THE DRAWINGS

FIG. 1A illustrates a handheld computer coupled to an accessory device under an embodiment of this invention.

FIG. 1B shows a side view of FIG. 1A.

FIG. 3 is exploded isometric view of a mechanical coupling incorporated into an accessory device under an embodiment of this invention.

FIG. 6A is a side view of a latch mechanism in an engaged position under an embodiment of the invention.

FIG. 6B is a side view of the latch mechanism of FIG. 6A in a disengaged position, under an embodiment of the invention.

DETAILED DESCRIPTION

Figure 2A:
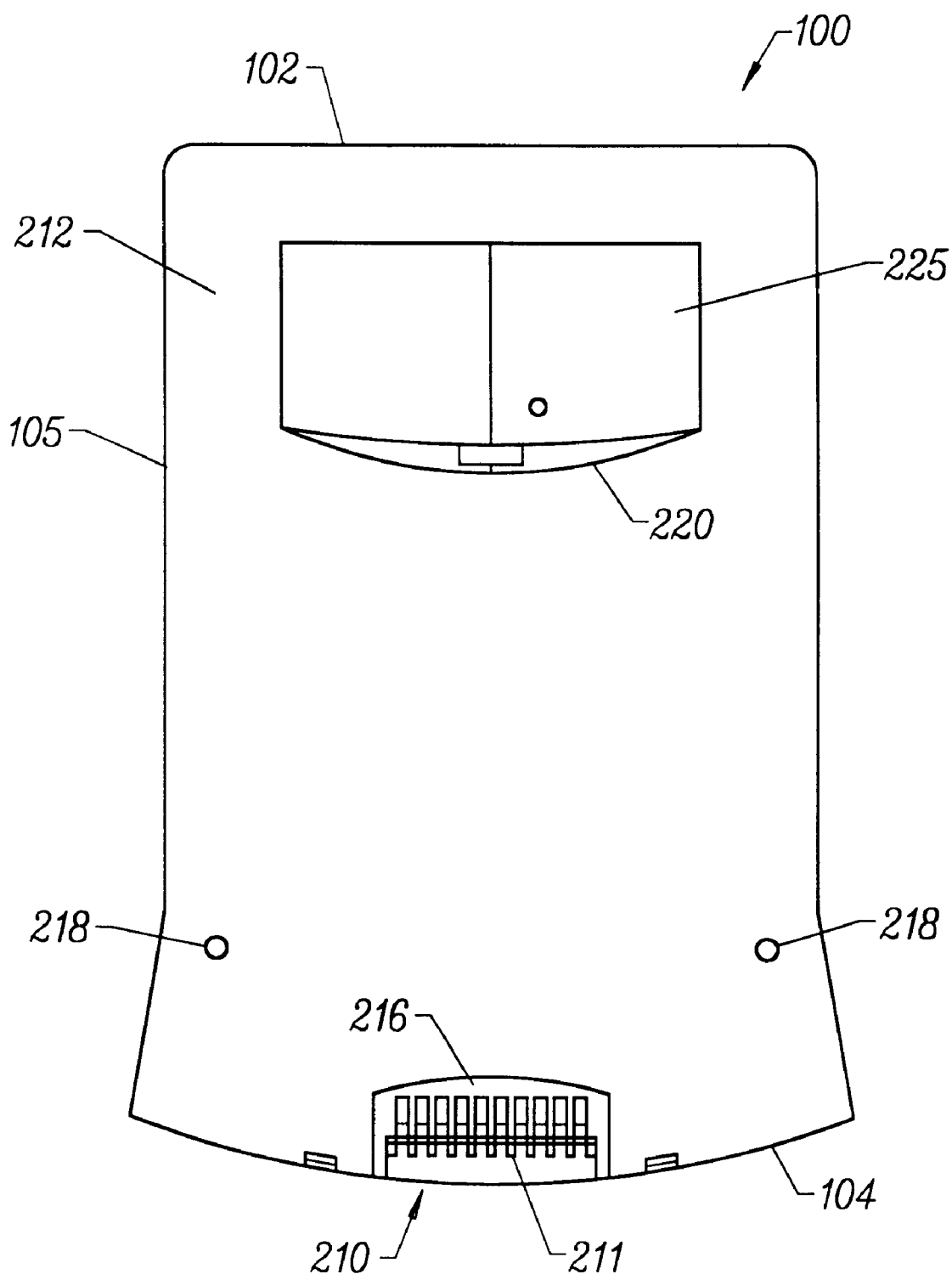
FIG. 2A shows a back side of a handheld computer under an embodiment of this invention.

Embodiments of this invention provide for an insertion coupling that allows an accessory device to be coupled to and secured with a handheld computer. An embodiment of this invention couples an accessory device to a back face of a handheld computer while a coupling of the accessory device connects to a communications or output port of the handheld computer. The accessory device is aligned in a "piggy-back" position with the handheld computer so that the accessory device and handheld computer form a portable combination that enables the accessory device to be carried with the handheld computer using a single hand. The accessory device is coupled to the handheld computer by use of a mechanical coupling that inserts into the back face of the handheld computer. The mechanical coupling may further provide a tactile response that signals a secure engagement between the handheld computer and the accessory device. Preferably, the accessory device has lateral and longitudinal dimensions that complements the handheld computer's dimensions so that the combination of the two devices is easy to hold. The accessory device may include, for example, a modem accessory devices which can add communication abilities to the handheld computer. For purpose of this disclosure, a handheld computer is a combination of a processor and memory, having a portable energy source, and being housed in a manner to be carried with one hand.

FIG. 1A illustrates a handheld computer 100 that is detachably coupled to an accessory device 110 under an embodiment of this invention. The handheld computer 100 may include palm style computers such as a Palm pilot™, Palm III™, or Palm V™, or Palm VII™ organizers, manufactured by the 3Com Corporation. Other embodiments of the invention can include Windows CE™ handheld computers, or other handheld computers and personal digital assistants.

Preferably, the handheld computer 100 has interactive hardware and software that perform functions such as maintaining calendars and phone lists. The handheld computer 100 shown in FIG. 1 includes a plurality of input functions keys 117 and a display 113 having graphic user interface features. The display 113 may be provided with an interface that allows the user to select and alter displayed content using a pointer such as a stylus. In an embodiment, the display 113 also includes a Graffiti™ writing section 118 for tracing alphanumeric characters as input. A plurality of input buttons 119 for performing automated or pre-programmed functions may be provided on a portion of the display 113.

The accessory device 110 may be one of several types of accessories, such as a modem device for serial and/or wireless data communications, a Universal Serial Bus (USB) device, or a communication cradle having an extended housing. The accessory device 110 may include one or more ports for parallel and/or serial data transfer with other computers or data networks. The handheld computer 100 may use the accessory device 110 for the purpose of downloading and uploading software, and for synchronizing data on the handheld computer 100 with a personal computer (not shown, but may be included or used with some embodiments of the invention). The accessory device 110 couples to the handheld computer 100 through an electrical connector (see FIG. 2A) located at a bottom portion of its front face. A button 155 on the accessory device 110 may effectuate an electrical connection between the accessory device 110 and the handheld computer 100 when the two are connected.

In an embodiment, the accessory device has a housing that is shaped according to the dimensions and contours of the handheld computer 100. The accessory device 110 may be referenced with respect to a pair of opposing lateral sides 115, 115, a top edge 112, and a bottom edge 114. Similarly, the handheld computer 100 may be referenced with respect to opposing lateral edges 105, 105 a top edge 102, and a bottom edge 104. A width of the accessory device 110 defined as a distance between lateral sides 115, 115 is preferably fractionally less than a corresponding width of the handled computer 100 between lateral edges 105, 105. The top edge 112 of the accessory device 110 is also only a fraction less than a corresponding top edge 102 of the handheld computer 100. A bottom edge 114 of the accessory device 110 extends beyond a bottom edge 104 of the handheld computer 100 and forms a ledge 116. Preferably, the ledge 116 is contoured to match a thickness profile of the handheld computer 100.

FIG. 1B illustrates the accessory device 110 of an embodiment contoured and dimensioned to detachably retain the handheld computer 100. The accessory device 110 includes a front face 262 (shown in FIG. 2B) that extends a majority portion of a back face 212 (shown in FIG. 2A) of the handheld computer 100. The ledge 116 includes a concaved surface 106 to match the thickness profile of the handheld computer 100. When mechanically coupled, the handheld computer 100 abuts and contacts the front face 262 of the accessory device 110, with the electrical connector of the accessory device 110 in contact with a connector in an output port 210 (FIG. 2A) of the handheld computer 100.

FIG. 2A illustrates the back face 212 of the handheld computer for use with an embodiment of this invention. An output port 210 is positioned adjacent to the bottom edge 104 of the handheld computer 100. The output port 210 includes an insulative body 216 that houses a plurality of electrical contacts 211. An aperture 220 is adapted to receive an insertion coupling 250 (see FIGS. 2B–6B) extending from the accessory device 110. In an embodiment, the aperture 220 is rectangular to match the shape of a spring-biased first member 375 (FIG. 3) extending from the coupling. A recess portion 225 on the back face 212 provides head room to receive the insertion coupling 250 into the aperture 220. A pair of alignment protrusions 218 are aligned on the back face 212 to engage alignment surfaces 228 (see FIG. 2B) of the accessory device 110. The alignment protrusions 218 ensure that the output port 210 connects with an electrical connector of the accessory device 110 (discussed with FIG. 2).

Figure 2B:
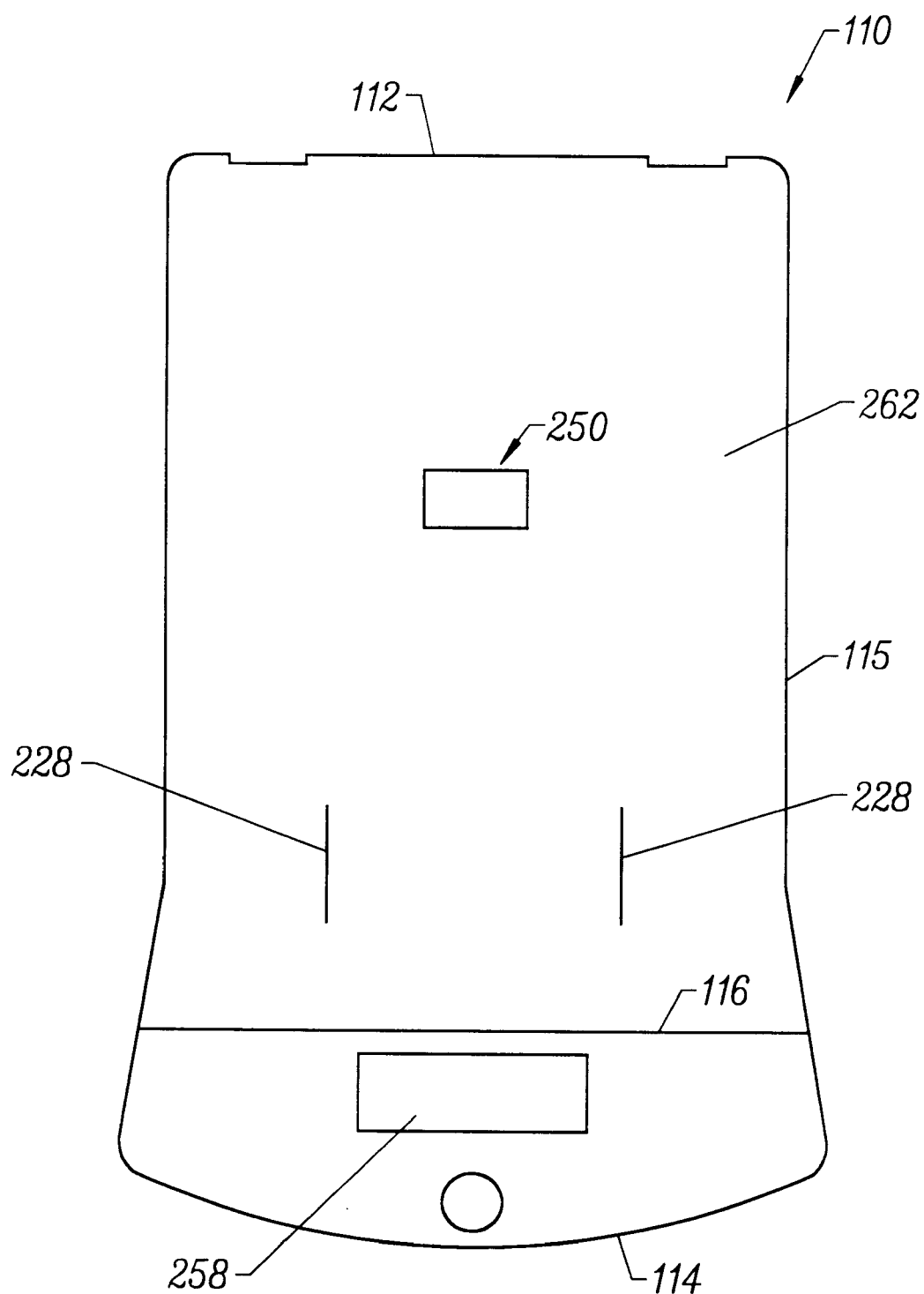
FIG. 2B shows a front side of an accessory device under an embodiment of this invention.

FIG. 2B illustrates the front face 262 of the accessory device 110 under an embodiment of the invention. The insertion coupling 250 extends from the front face 262. As will be further described, the insertion coupling 250 is adapted to engage the aperture 220 on the back face 212 of the handheld computer 100. Preferably, the distance between the opposing lateral sides 115, 115 of the accessory device 110 is slightly less than or equal to the corresponding width of the handheld computer 100. In an embodiment, the width of the accessory device 110 is approximately 90% of the width of the handheld computer 100. For example, a handheld computer 100 such as the Palm V™ measures approximately 3.0" between its lateral edges 105, and a preferred accessory device 110 measures 1.75". Similarly, the top edge 102 of the handheld computer 100 is substantially in alignment with the top edge 112 of the accessory device 110. The bottom edge 114 of the accessory device 110 extends beyond the bottom edge 104 of the handheld computer 100 and shapes into the ledge 116 that cradles and supports the handheld computer 100 from the bottom. When coupled, the handheld computer 100 and the accessory device 100 may be grasped with a single hand and carried together as a single unit. The front face 262 is contoured on the perimeter to match the shape of the handheld computer 100, so that the two devices better form a unit when coupled.

A bottom opening 258 on the front face 262 accesses an electrical connector (not shown) of the accessory device 110 to the handheld computer 100. The bottom opening 258 is preferably positioned adjacent to the ledge 116 so that the electrical connector can be angled parallel or acutely with respect to the front face 262. This position allows the electrical connector to couple to the output port 210 on the bottom edge 114 of the handheld computer 100. In alternative embodiments, the electrical connector may extend outward from the front face 262, or the bottom opening 258 may be positioned elsewhere on the device to access the electrical connector with other communication ports such as IR ports, PCMCIA slots, and RJ connectors. The alignment surfaces 228 on the front face 262 are aligned and adapted to receive the alignment protrusions 218 of the accessory device 110.

FIG. 3 details an insertion coupling 250 of an embodiment of this invention incorporated into an accessory device 110. The accessory device 110 includes a housing formed from a front panel 310 joined with a back panel 320. The back panel 320 is adapted to align with a peripheral rim 322 of the front panel 310, and a plurality of connector holes 318, 319 are used to receive fasteners which secure the front and back panels 310 and 320 together.

A length of the accessory device 110 is defined by a distance between the top and bottom edge 112 and 114. The periphery of the accessory device 110 is contoured to match the shape of the handheld computer 100. The front and back panels 310 and 320 each include a respective flair portion 340, 342 near the bottom edge 104. The resulting contour of the periphery of the accessory device 10 matches the shape of a Palm III™ or Palm V™ organizers.

The front panel 310 includes an exterior side that forms the front face 262 (shown in FIG. 2B) of the accessory device 110. Similarly, the back panel 320 includes a back face 352 for the accessory device 110. The bottom portion of the front panel 310 includes the bottom opening 258 for accessing an electrical connector (not shown) of the accessory device 110 with an output port 210 (shown in FIG. 2A) of the handheld computer 100.

The insertion coupling 250 engages and is accessible through an opening 386 in a front portion of the front panel 310. The insertion coupling 250 includes a base 385 that secures to the interior of the front panel 310. The base 385 is preferably flat with respect to the front panel 310. A pair of apertures 381 and 383 of the base 385 are aligned over corresponding fastener holes 321 and 323 on the interior of the front panel 310. The fastener holes 321 and 323 receive fasteners 382 and 384 that secure the insertion coupling 250 to the front panel 310.

The insertion coupling 250 includes a first member 375 that moveably couples to the base 385 and extends in an orthogonal direction from the base 385 beyond the front face 354. A second member 380 is fixed with respect to the base 385 and extends in the orthogonal direction adjacent to the first member 375 so as to be staggered with respect to the first member 375. The first member 375 is slideably coupled to the base 385 to be moveable in a lateral direction. The first member 375 couples to the base 385 by engaging a torsion spring 366 so that the torsion string biases the first member 375 in the lateral direction with respect to the base 385. In this way, first member 375 is moveable into a contracted position in which the torsion spring 366 is biased and the first and second members 375 and 380 are laterally aligned with one another. In this position, the lateral length of the combination of the first and second members 375 and 380 is a minimum. When released into an extended position, the first member 375 extends laterally away from the second member 380.

The first member 375 includes a tail portion 367 which extends to the back face 352 of the accessory device 110. The first member 375 may be moved between the extended and contracted position by moving either the first member 375 or its tail portion 367.

The insertion coupling 250 further includes a retainer 360 that inserts through the opening 386. The retainer 360 engages the front face 262 while either retaining or exposing the first member 375. In an embodiment, the retainer 360 includes a rim 362 that obstructs against the peripheral wall 387. The peripheral wall 387 constrains the movement of the retainer 360 beyond the front face 354 of the front panel 310. A spring 364 for biasing the retainer 360 fits over the peripheral wall 387 of the opening 386. Preferably, the spring 364 secures to the retainer 360 by engaging ridges 368, 368 on an interior surface 363 of the rim 362. The spring 364 is configured so that when the retainer 360 is depressed inwards, the spring 364 biases the retainer 360 outward.

At the back panel 320, a release member 334 engages the tail portion 367 of the first member 375. The release member 334 is moveable between a first position where the first member 375 is in the extended position, and a second position in which the release member 334 moves the first member 375 into the contracted position. When the release member 334 contacts the tail portion 367, the first member 375 is moved into a contracted position to bias the torsion spring 366 to return to its original position.

Figure 4:
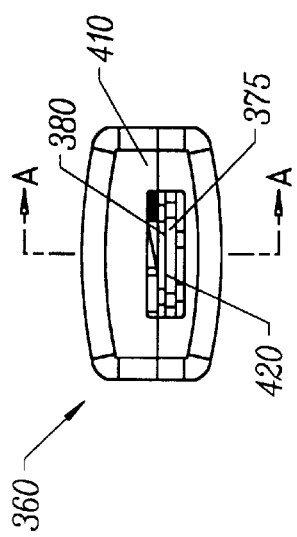
FIG. 4 is a top view of a retainer used with an embodiment of the invention.

FIG. 4 shows the retainer 360 having a slit 460 which retains the first member 375 and second member 380 in a contracted and biased state. The slit 460 is dimensioned to retain the first and second member 375 and 380 when the first member 375 is in the contracted position. The slit 460 is further dimensioned to obstruct a distal surface 410 of the retainer 360 against first and second members 375 and 380 when the first member 375 is in the extended position. In this way, the first member 375 must be at least partially contracted in order for the slit 460 to retain the insertion coupling 250.

Figure 5B:
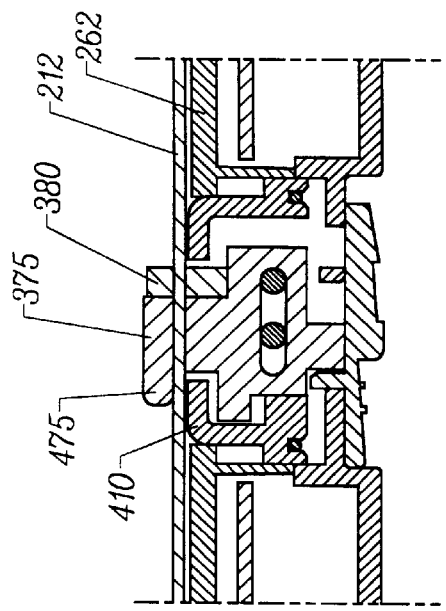
FIG. 5B is a side view of FIG. 4 showing the insertion coupling retained in an engaged position, under an embodiment of the invention.
Figure 5A:
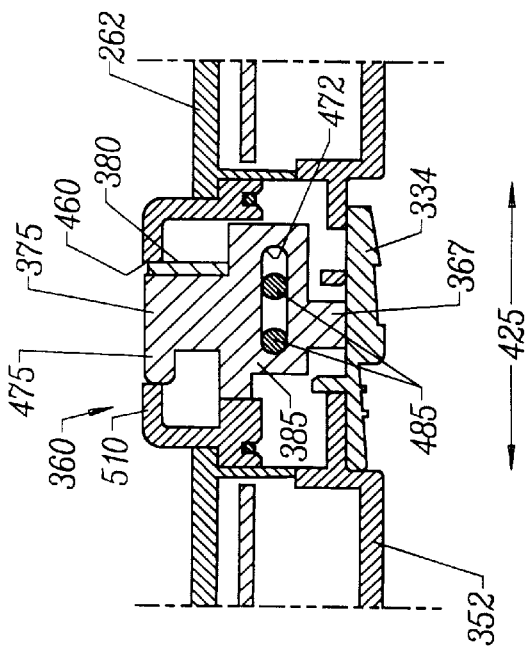
FIG. 5A is a side view of FIG. 4 showing the insertion coupling in a disengaged position, under an embodiment of the invention.

FIG. 5A is a cut-away view along lines A—A of FIG. 4 showing the interior of the retainer 360 under an embodiment of the invention. FIG. 5A shows the retainer 360 in an extended position distal to the front face 262 of the accessory device 110. The slit 460 of the retainer 360 is dimensioned to frictionally retain the first member 375 in a contracted and biased state within the confines of the retainer 360. In an embodiment, the retainer 360 is dimensioned so that the first member 375 exerts a force on an edge or surface (not shown) of the slit 420. A slideable connection is formed at the base 385 by a slot 472 of the first member 375 coupling with a pair of protrusions 485 extending from the base 385. The first member 375 is then moveable in a lateral direction shown by directional arrow 425. The first member 375 includes a hooked end 475. The tail portion 367 of the first member 375 extends to couple with the release member 334 at the back face 352 of the handheld computer 100.

FIG. 5B illustrates the first member 375 in an orientation for engagement with the back face 212 of the handheld computer 100. The first member 375 is exposed when the distal surface 410 of the retainer 360 is forced into the depressed position proximal to the front face 262 of t he accessory device 110. In an embodiment, depressing the retainer 360 overcomes the frictional retainment of the first member 375 within the slit 420. Once the retainer 360 is depressed, the first member 375 is exposed and moves laterally in the direction of arrows 425 away from the second member 380, which is static with respect to the base 385. The hooked end 475 of the first member 375 is then captured within the handheld computer 100, thereby securing the handheld computer 100 to the accessory device 110.

FIG. 6A shows a side view of a portion of the insertion coupling 250 in an "engaged" position, corresponding to the first member 375 being engaged with the aperture 220 on the back face 212 of the handheld computer 100. In this position, the first member 375 is extended away from the second member 380 (shown partially in phantom). The first member 375 is coupled to the base 385 (shown in FIG. 3) by slideably engaging protrusions 485 of the base to the slot 472 of the first member 375. The torsion spring 366 extends over the protrusions 485. In the engaged position, the first member 375 is extended from the second member 380, so that the bias applied by the torsion spring 366 is minimal or nonexistent. The torsion spring 366 exerts a lateral force on the first member 375 when the first member is moved from the extended position (shown by FIG. 6A) to the contracted position (shown by FIG. 6B).

FIG. 6B shows a side view of a portion of the insertion coupling 250 in an "disengaged" position, corresponding to the first member 375 being contained within the retainer 360 in a contracted state. In this position, the first member 375 is laterally aligned with the second member 380, so that the length of the first and second member 375 and 380 combined is a minimum. The torsion spring 366 is biased to push the first member 375 laterally away from the second member 380. The bias helps to retain the first member 375 within the slit 420 of the retainer 360. As further shown by FIGS. 6A and 6B, the tail portion 470 may be used to move the first member 375 further into the contracted state, thereby allowing release of the first member 375 from the aperture 220 of the handheld computer 100.

Using Embodiments of this Invention

This invention allows the handheld computer 100 to be coupled with the accessory device 110 in a swift and secure manner. Under an embodiment, the handheld computer 100 is slid along the front face of the accessory device 110 so that the connector of the accessory device establishes electrical contact with the output or communications port of the handheld computer 100. Features such as the alignment surfaces on the front face 262 of the accessory device 110 and/or the back face 212 of the handheld computer 100 facilitate alignment of the electrical connector with the port of the handheld computer 100. By electrically connecting the connectors, the aperture 220 of the handheld computer 100 is aligned with the insertion coupling 250 of the accessory device 110. The handheld computer 100 may then be pushed back so that the insertion coupling engages the aperture 220 to secure the handheld computer 100 with the accessory device 110. The release member 334 on the front face 262 of the accessory device 110 may be used to release the insertion coupling from the handheld computer 100.

Embodiments of this invention enable the handheld computer 100 to be secured with the accessory device 110 using two swift motions consisting of sliding the handheld computer 100 along the front face 262 of the accessory device 110 and then pushing the handheld computer 100 back to engage the insertion coupling 250. A user can hold the handheld computer 100 and accessory device 110 in separate hands and move the handheld computer 100 or accessory device 110 in a manner that causes the two devices to secure to one another by manipulating the alignment of the two devices while bringing the hands together. Therefore, in contrast to previous devices, the user does not have to rotate the handheld computer, or to first let go of one of the devices to effectuate the coupling that retains the two devices together.

The mechanical coupling also provides a tactile response that signals the handheld computer 100 is secured with the accessory device 110. The tactile response may be in the form of a "snap", corresponding to the first spring-biased member expanding inside the back face of the handheld computer 100. This simplifies coupling the handheld computer 100 and accessory device 110, and further avoids mishaps that may arise if the coupling between the handheld computer 100 and the accessory device 110 is unknowingly defective.

Conclusion

The foregoing description of various embodiments of the invention have been presented for purposes of illustration and description. It is not intended to limit the invention to the precise forms disclosed. Many modifications and equivalent arrangements will be apparent.

What is claimed is:

1. An accessory device for a handheld computer, the handheld computer including a front face having a display, a back face, a pair of opposing lateral edges defining a width of the handheld computer, and a top edge and a bottom edge defining a length of the handheld computer, wherein the accessory device comprises:

a front surface and a back surface, a pair of opposing lateral sides and a top edge and a bottom edge, the pair of opposing lateral sides defining a width of the accessory device, and the top edge and the bottom edge defining a length of the accessory device; and a mechanical coupling for inserting into a back face of the handheld computer to detachably secure the front surface of the accessory device with the back face of the handheld computer.

2. The accessory of claim 1, further comprising a connector separate from the mechanical coupling for providing communications between the accessory device and the handheld computer.

3. The accessory device of claim 1, wherein the mechanical coupling is spring-biased to insert into the back face of the handheld computer.

4. The accessory device of claim 1, wherein the mechanical coupling comprises:

a base secured to the front face of the accessory device; and a first member extending from the base in a direction orthogonal to the front face and being slideable in a direction parallel to the front face, the first member being biased between an extended position and a contracted position, wherein the first member is adapted to be received in a slot of the back face of the handheld computer when in the contracted position.

5. The accessory device of claim 1, wherein the first member includes an enlarged endpiece that is adapted to obstruct against an interior of the back face after the first member has been exposed to release into the expanded state within the handheld computer.

6. The accessory device of claim 1, wherein the electrical connector is positioned on a bottom portion of the front surface to access an output port of the handheld computer positioned at or near the bottom edge of the handheld computer.

7. The accessory device of claim 1, wherein the accessory device is dimensioned so that the width of the accessory device is less than the width of the handheld computer.

8. The accessory device of claim 1, wherein the accessory device is dimensioned so that the width of the accessory device is within 90% of the width of the handheld computer.

9. The accessory device of claim 1, wherein the accessory device is dimensioned so that at least two edges of the accessory device are contained within a perimeter equal to the dimensions of the handheld computer.

10. The portable computing assembly of claim 1, wherein the accessory device is a modem device.

11. The portable computing assembly of claim 1, wherein the accessory device is either a universal serial port device or a modem communication device.

12. The accessory device of claim 4, wherein the mechanical coupling further comprises:

a retainer engaged with an opening of the front face of the accessory device, the retainer being moveable between an extended position distal to the front face of the accessory device and a depressed position proximal to the front face of the accessory device, the retainer being engaged with the first member to allow the first member to release into the extended state when the retainer is moved into the depressed position.

13. The accessory device of claim 4, wherein a distal surface of the retainer includes a slit that retains the first member in the contracted state, and wherein the retainer and the first member are aligned so that upon the back face of the handheld computer depressing the retainer, the first member is engaged with an aperture on the back face of the handheld computer and then moved into the expanded state to secure the first member with the handheld computer.

14. The accessory device of claim 8, wherein the width of the accessory device is 2.75 inches, and the width of the handheld computer is 3.0 inches.

15. The accessory device of claim 8, wherein the bottom edge of the accessory device extends beyond a perimeter equal to the dimensions of the handheld computer.

16. The accessory device of claim 13, wherein the retainer is biased in the depressed position to move the distal surface towards the extended position.

17. The portable computing assembly of claim 15, wherein the accessory device includes a ledge that supports the bottom edge of the handheld computer.

18. The accessory device of claim 16, wherein a release member couples to the first member to move the first member between the contracted and expanded states.

19. The accessory device of claim 10, wherein the release member is an extension of the first member that is accessible from the back surface of the accessory device.

20. A coupling for securing an accessory device to a handheld computer, the coupling comprising:

a base secured to a front face of the accessory device; and a first member extending from the base in a direction orthogonal to the base and being slideable in a direction substantially parallel to the base, the first member being biased between an extended position and a contracted position, wherein the first member is adapted to be received in a slot of a handheld computer when in the contracted position.

21. The coupling of claim 20, further comprising:

a retainer that retains the first member in the contracted state, the retainer being engaged with an opening of a front face of the accessory device, the retainer being moveable between an extended position distal to the front face and a depressed position proximal to the front face, the retainer being engaged with the first member to allow the first member to release into the extended state when the retainer is moved into the depressed position.

22. The coupling of claim 20, wherein the first member includes an enlarged endpiece that obstructs against an interior of the handheld computer after the first member has been exposed to release into the expanded state within the handheld computer.

23. The coupling of claim 21, wherein a distal surface of the retainer includes a slit that retains the first member in the contracted state, and wherein the retainer and the first member are aligned so that upon the retainer being depressed, the first member is exposed from the retainer to move into the expanded state.

24. The coupling of claim 23, wherein the retainer is biased in the depressed position to move the distal surface towards the extended position.

25. The coupling of claim 24, wherein a release member of the accessory device couples to a tail portion of the first member to move the first member between the contracted and expanded states.

26. An accessory device for a handheld computer, the handheld computer including a front face having a display, a back face, a pair of opposing lateral edges defining a width of the handheld computer, and a top edge and a bottom edge defining a length of the handheld computer, wherein the accessory device comprises:

a front surface and a back surface, a pair of opposing lateral sides and a top edge and a bottom edge, the pair of opposing lateral sides defining a width of the accessory device, and the top edge and the bottom edge defining a length of the accessory device;

a means for detachable securing the accessory device to the handheld computer using a coupling that inserts into the back face of the handheld computer; and a means for providing communications between the accessory device and the handheld computer, the communications means being separate from the means for detachably securing the accessory device with the handheld computer.

* * * * *